(12) United States Patent
Deckers et al.

(10) Patent No.: US 7,637,604 B2
(45) Date of Patent: Dec. 29, 2009

(54) INK-JET PRINTING PROCESS AND INK-JET INKS USED THEREIN

(75) Inventors: Bernard Deckers, Viezenbeek (BE); Keith Edward Nixon, Broadstairs (GB)

(73) Assignee: Agfa Graphics NV, Mortsel (BE)

( * ) Notice: Subject to any disclaimer, the term of this patent is extended or adjusted under 35 U.S.C. 154(b) by 456 days.

(21) Appl. No.: 10/506,516

(22) PCT Filed: Feb. 27, 2003

(86) PCT No.: PCT/GB03/00832

§ 371 (c)(1),
(2), (4) Date: Mar. 25, 2005

(87) PCT Pub. No.: WO03/074619

PCT Pub. Date: Sep. 12, 2003

(65) Prior Publication Data

US 2005/0168550 A1  Aug. 4, 2005

(30) Foreign Application Priority Data

Mar. 5, 2002  (GB)  .................... 0205151.4

(51) Int. Cl.
  *B41J 2/17*   (2006.01)
  *G01D 11/00*  (2006.01)
(52) U.S. Cl. ........................ 347/100; 347/95
(58) Field of Classification Search ............ 347/15, 347/41–43, 5, 95–96, 100–102, 7; 106/31.13, 106/31.6, 31.27
See application file for complete search history.

(56) References Cited

U.S. PATENT DOCUMENTS

| 5,531,818 | A | * | 7/1996 | Lin et al. .................. 106/31.28 |
| 5,748,208 | A | * | 5/1998 | Uchiyama et al. ............. 347/43 |
| 5,767,876 | A | * | 6/1998 | Koike et al. ................... 347/43 |
| 6,074,052 | A | * | 6/2000 | Inui et al. ..................... 347/101 |
| 6,084,619 | A | * | 7/2000 | Takemoto et al. ............. 347/96 |
| 6,145,979 | A |   | 11/2000 | Caiger et al. |
| 6,457,823 | B1 | * | 10/2002 | Cleary et al. ................. 347/102 |
| 6,534,128 | B1 | * | 3/2003 | Carlson et al. ............... 427/466 |
| 6,536,878 | B2 | * | 3/2003 | Kasperchik et al. ........... 347/65 |
| 2001/0015745 | A1 | * | 8/2001 | Onishi et al. ................. 347/101 |
| 2001/0038408 | A1 |   | 11/2001 | Codos et al. |
| 2002/0041317 | A1 | * | 4/2002 | Kashiwazaki et al. ........ 347/100 |
| 2002/0149659 | A1 | * | 10/2002 | Wu et al. ..................... 347/102 |
| 2003/0067527 | A1 | * | 4/2003 | Temple ........................ 347/101 |
| 2003/0081096 | A1 | * | 5/2003 | Young ......................... 347/102 |

FOREIGN PATENT DOCUMENTS

| EP | 0914875 | 5/1999 |
| WO | WO 00/30856 | 6/2000 |
| WO | WO 0228650 A1 * | 4/2002 | .................. 347/86 |

* cited by examiner

*Primary Examiner*—Julian D Huffman
*Assistant Examiner*—Jason S Uhlenhake
(74) *Attorney, Agent, or Firm*—Keating and Bennett, LLP

(57) ABSTRACT

The present invention relates to an improved process for wet-on-wet ink-jet printing. This invention provides a progressive dot printing ink-jet process comprising the steps of applying a first ink drop to a substrate and subsequently applying a second ink drop on to the first ink drop without intermediate solidification of the first ink drop. The first and second ink drops have a different viscosity, surface tension or curing speed. Further ink drops may be applied sequentially to the combined first and second ink drops without intermediate solidification of the first and subsequent ink drops.

21 Claims, No Drawings

INK-JET PRINTING PROCESS AND INK-JET INKS USED THEREIN

The present application is a United States National Phase application based upon international application number PCT/GB03/00832, filed 27 Feb. 2003, which claims priority from GB0205151.4, filed 5 Mar. 2002. Each of the aforementioned references is hereby incorporated herein by reference.

The present invention relates to an ink-jet ink printing process and in particular to the provision of an improved process for wet-on-wet ink-jet printing.

In ink-jet printing, minute droplets of ink are ejected in a controlled manner from one or more reservoirs or printing heads through nozzles onto a substrate, which is moving relative to the reservoirs. The ejected ink forms an image on the substrate. For high-speed printing, the inks must flow rapidly from the printing heads and this puts a number of constraints on the physical properties of the ink. These constraints include a low viscosity which for piezoelectric Drop-on-Demand (DOD) ink-jet printing is usually 1-50 mPas, preferably 6-30 mPas, particularly preferably 8-15 mPas (at the jetting temperature which may be from 25 to 110° C.), and a surface tension such that the jet can form the necessary small droplets (10-50 dyne/cm, preferably 25-35 dyne/cm). The ink must also be a homogenous liquid capable of rapid conversion to a dry printed area. The particles of pigment dispersed therein should have a particle size of less than 8 μm, preferably less than 3 μm and particularly preferably less than 1 μm.

The concept of piezoelectric ink-jet printing is based on the movement of a piezoelectric ceramic transducer when a voltage is applied thereto. When the voltage is applied, the shape of the ceramic changes, creating a void, which is filled with ink. When the voltage is then removed, the ceramic expands to its original shape, ejecting a drop of ink from the print head.

The printing system generally used is a flexible single pass unit with piezoelectric heads. One ink drop can therefore be printed onto another without intermediate solidification of the first ink drop. This is known as wet-on-wet printing. The phrase "without intermediate solidification" is understood in the art to mean that the first or subsequent ink drop is still liquid when the next ink drop is applied. In order to avoid curing the first or subsequent ink drops before the next ink drop is applied, the first or subsequent ink drops are not cured, i.e. they are not irradiated prior to application of the next ink drop. Wet-on-wet printing is primarily used in colour printing to apply ink drops of differing colours sequentially to the same area of the substrate which then combine to produce the desired colour. The typical four-colour set is Cyan, Magenta, Yellow, and Black known as C-M-Y-K but the technique is extendable to six-colour hexachrome or any progressive dot printing ink-jet process. The inks used are known 100% solids UV pigmented inks.

Good print definition quality requires the following: a rapid formation of a solid coloured dot from the ink composition; concentration of the ink colourants on the surface of the substrate without being absorbed into the substrate surface; control of the spread of the dot of colour formed on the surface of the substrate; limited merging or bleed of the ink of one colour from a dot to a neighbouring dot of a different colour; and uniformity of colour and colour density over the solid area of print formed from the droplets.

The most common problems associated with wet-on-wet printing are mottling, puddling and the lack of sharp lines. Mottling and puddling are related to the printing of solid areas when the colour density varies across the area of print. The sharpness of line edges is important in achieving clear images in, for example, text.

Accordingly, the present invention provides a progressive dot printing ink-jet process comprising the steps of applying a first ink drop to a substrate and subsequently applying a second ink drop on to the first ink drop without intermediate solidification of the first ink drop, wherein the first and second ink drops have a different viscosity, surface tension or curing speed.

Preferably, further ink drops are applied sequentially to the first and second ink drops without intermediate solidification of the combined first and subsequent ink drops.

Preferably, at least four ink drops are applied sequentially.

Preferably, the first and subsequent ink drops are different colours.

Preferably, the ink drops are cyan, magenta, yellow and black.

Preferably, the viscosity of the first and last ink drops applied varies in a graduated manner within a range of from 10 up to 30 mPas or 30 down to 10 mPas.

Preferably, the surface tension of the first and last ink drops applied varies in a graduated manner within a range of from 20 up to 40 dynes/cm or 40 down to 20 dynes/cm.

Preferably, the cure speed of the first and last ink drops applied varies in a graduated manner within a range of from 20 up to 70 m/min or 70 down to 20 m/min.

In another embodiment, the present invention also provides a set of ink-jet inks suitable for use in a progressive dot printing ink-jet process comprising at least two inks having a different viscosity, surface tension or curing speed.

In a further embodiment, the present invention also provides an ink dispenser holding a set of ink-jet inks.

The ink compositions of the present invention include at least three main components. These are (i) monomers and/or oligomers, (ii) photoinitiators, and (iii) colourant(s), preferably a pigment. In addition, the inks may, optionally, contain surfactant and synergist additives.

Monomers, oligomers or prepolymers may possess different degrees of functionality, and a mixture including combinations of mono-, di-, tri- and higher functionality monomers, oligomers or prepolymers may be used. These components are curable, typically photocurable, e.g. UV curable, and should adhere to the substrate surface after printing and serve to bind the pigment. Also adjusting the ratio of the monomers or oligomers is a method of adjusting the viscosity of the ink. To obtain a gradient of viscosity the ratio between monomers and oligomers is modified. A higher functionality results in a higher viscosity. The viscosity varies in graduations from the most viscous ink to the least viscous ink or vice versa. Preferably, the viscosity varies from 10 up to 30 mPas or 30 down to 10 mPas, particularly preferably from 12 up to 22 mPas or 22 down to 12 mPas. The viscosity is measured using standard techniques known in the art.

Additionally, improvements in print quality may be achieved using a gradient of surface tension across the progressive colours (e.g. C-M-Y-K). To obtain a gradient of surface tension the ratio of monomers, oligomers or prepolymers is modified and also surfactant additives are used to lower the surface tension. Preferably, the surface tension varies from 20 up to 40 dynes/cm or 40 down to 20 dynes/cm. Particularly preferably from 22 up to 31 dynes/cm or 31 down to 22 dynes/cm. The surface tension is measured using standard techniques known in the art.

Furthermore, improvements in print quality are achieved using a gradient of cure speeds across the progressive colours (e.g. C-M-Y-K). To obtain a gradient in cure speeds the initiators and synergist additives are modified. Preferably, the cure speed varies from 20 up to 70 meters (m)/min or 70 down to 20 m/min. Particularly preferably from 30 up to 50 m/min or 50 down to 30 m/min. Measurements are made on a 12 μm film of ink coated onto rigid PVC and passed under a 120 W/cm medium pressure mercury lamp.

Although the viscosity, surface tension or cure speed of the first and subsequent drops may vary in graduations from low to high or high to low, it is preferred that the first and subsequent drops increase in viscosity, i.e. that the first and subsequent drops vary in graduations from least viscous to most viscous, and that the surface tension of the drops and the cure speed decreases from the first to the last ink printed, i.e. from highest surface tension to lowest surface tension and from highest cure speed to lowest cure speed.

The monomers, oligomers or prepolymers (i) are typically monofunctional and/or polyfunctional acrylate monomers, oligomers or prepolymers, such as an ester of acrylic or methacrylic acid, such as octyl acrylate, decyl acrylate, hydroxyethyl methacrylate lauryl acrylate, phenoxyethyl acrylate, hexanediol diacrylate, polyethylene glycol diacrylate, tri(propylene glycol) triacrylate, trimethylolpropane triacrylate, bis(pentaerythritol) hexa-acrylate; or an N-vinylamide such as, N-vinylcaprolactam or N-vinylformamide; or acrylamide or a substituted acrylamide, such as acryloylmorpholine. Preferred monomers, oligomers or prepolymers are the acrylate esters of the ethoxylated or propoxylated derivatives of di-, tri- or tetrahydric aliphatic alcohols, and the acrylate or methacrylate esters of epoxy, urethane, melamine or polyester resins or their ethoxylated or propoxylated derivatives.

These components may be sold under the names: Ebecryl 40, Ebecryl 1039, DPGDA, TPGDA, ODA-n, TTEGDA, Ebecryl 160, OTA 480, IRR 289, TMPTA, IRR 184, Ebecryl 111, Ebecryl 110, IBOA, HDDA, Ebecryl 81, ACTILANE 872, ACTILANE 735, ACTILANE 584, ACTILANE 525, ACTILANE 440, ACTILANE 432, ACTILANE 430, ACTILANE 423, ACTILANE 421 and ACTILANE 251.

The term "monofunctional" means one reactive functional group, e.g. acrylate, per monomer or oligomer and includes IBOA, Ebecryl 110, ODA-N and Ebecryl 1039. The term "polyfunctional" means more than one reactive functional group, e.g. acrylate, per monomer or oligomer and includes HDDA, DPGDA, TPGDA, TTEGDA, TMPTA and OTA 480.

Photoinitiators (ii) are necessary for free radical curing and may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl)butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone Other useful photoinitiators are the so-called "cationic" type, which liberate a diffusible strong acid on exposure to ultra-violet light. Examples include iodonium and sulfonium salts, such as diphenyliodonium fluoride and triphenylsulfonium hexafluophosphate.

These may be sold under the Trade names of Irgacure 184, Irgacure 500, Darocure 1173, Irgacure 907, ITX, Lucerin TPO, Irgacure 369, Irgacure 1700, Darocure 4265, Irgacure 651, Irgacure 819, Irgacure 1000, Irgacure 1300, Esacure KT046, Esacure KIP150, Esacure KT37, Esacure EDB, H-Nu 470 and H-Nu 470X.

Colourants (iii) may be suitable dyes or preferably pigments selected for colour, dispersion or the other reasons. Colourants are well known in the art and include, but are not limited to those within the ranges having the following CI classifications: Green PG 7 and 36; Orange PO 5, 34, 36, 38, 43, 51, 60, 62, 64, 66, 67 and 73; Red PR 112, 149, 170, 178, 179, 185, 187, 188, 207, 208, 214, 220, 224, 242, 251, 254, 255, 260 and 264; Magenta/Violet PV 19, 23, 31 and 37 and PR 122, 181 and 202; Yellow PY 17, 120, 138, 155, 168, 175, 179, 180, 181 and 185; Blue PB 15; Black PB 2, 5 and 7. Examples of specific pigments include IRGALITE BLUE GLVO, MONASTRAL BLUE FGX, IRGALITE BLUE GLSM, HELIOGEN BLUE L7101F, LUTETIACYANINE ENJ, HELIOGENBLUE L6700F, MONASTRAL GNXC, MONASTRAL GBX MONASTRAL GLX MONASTRAL 6Y, IRGZIN DPP ORANGE RA, NOVAPERM ORANGE H5G70, NOVPERM ORANGE HL, MONOLITE ORANGE 2R, NOVAPERM RED HFG, HOSTAPERM ORANGE HGL, PALIOGEN ORANGE L2640, SICOFAST ORANGE 2953, IRGAZIN ORANGE 3GL, CHROMOPTHAL ORANGE GP, HOSTAPERM ORANGE GR PV CARMINE HF4C, NOVAPERM RED F3RK 70, MONOLITE RED BR, IRGAZIN DPP RUBINE TR, IRGAZIN DPP SCARLET EK, RT-390-D SCARLET, RT-280-D RED, NOVAPERM RED HF4B, NOVAPERM RED HF3S, NOVAPERM RED HF2B, VYNAMON RED 3BFW, CHROMOPTHAL RED G, VYNAMON SCARLET 3Y, PALIOGEN RED L3585, NOVAPERM RED BL, PALIOGEN RED 3880 HD, HOSTAPERM P2GL, HOSAPERM RED P3GL, HOSTAPERM RED E5B 02, SICOFAST RED L3550, SUNFAST MAGENTA 122, SUNFAST RED 122, SUNFAST VIOLET 19 228-0594, SUNFAST VIOLET 19 228-1220, CINQUASIA VIOLET RT-791-D, VIOLET R NRT-201-D, RED B NRT-796-D, VIOLET R RT-101-D, MONOLITE VIOLET 31, SUNFAST MAGENTA 22, MAGENTA RT-243-D, MAGENTA RT 355-D, RED B RT-195-D, CINQUASIA CARBERNET RT-385-D, MONOLITE VIOLET R, MICROSOL VIOLET R, CHROMOPTHAL VIOLET B, ORACET PINK RF, IRGALITE YELLOW 2GP, IRGALITE YELLOW WGP, PV FAST YELLOW HG, PV FAST YELLOW H3R, HOSTAPERM YELLOW H6G, PV FAST YELLOW, PALIOTOL YELLOW D1155 AND IRGZIN YELLOW 3R.

Synergist additives may be used to improve the curing quality and to diminish the influence of the oxygen inhibition. Such additives include, but are not limited to ACTILANE 800, Ebecryl P115, Ebecryl 350, ACTILANE 725, CD 1012 and DIDMA.

Surfactant additives are used primary to modify the surface tension of the inks. Such additives include, but are not limited to ACTILANE 800, Tego glide 410, Tego glide 435, Tego glide 440, Tego glide 450, Tego flow 300, Tego flow 425, Tego flow ZFS460, Tego rad 2100, Tego rad 2200-N, Tego rad 2600, Tego rad 2700, Tego wet ZFS453, Tego wet 250, Dow corning 67, SR 492, SR 9003, Surfadone 300, BYK 306, FC-430, Fc-171, FC-431, Tego disperse 610, Tego disperse 710, anti terra-u, Disperbyk 108, anti terra 204, EFKA 47 and EFKA 400.

EXAMPLES

In order to exemplify the present invention the following formulation was used:

| | |
|---|---|
| Monofunctional acrylate | 15-45% |
| Polyfunctional acrylate | 45-55% |
| Photoinitiators | 1.0-6.0% |
| Amine acrylate (Synergist additive) | <5% |
| Pigment dispersion | <3% |
| Tegorad 2100 (Surfactant additive) | 0.01-2.0% |

Wet-on-wet printing was carried out using a Barco ink-jet (Dot factory) printer on a substrate of self-adhesive PVC foil.

Example 1

Inks having a gradient of viscosity of between 12 and 22 mPas across the colours C-M-Y-K were prepared and tested using wet-on-wet printing according to the printing process outlined above. To achieve the viscosity gradient the monofunctional to polyfunctional ratio was varied from 0.35 to 1.5.

The gradient of viscosity was varied from CYAN to BLACK starting at 12 mPas for CYAN and ending at 22 mPas for BLACK, using the following order for the colours:

| | |
|---|---|
| 1) CYAN | 12 mPas |
| 2) MAGENTA | 14 mPas |
| 3) YELLOW | 18 mPas |
| 4) BLACK | 22 mPas |

This gave improved print results compared with inks having the same viscosity. In particular, there was there less mottling and puddling, the lines produced were sharper, and the colour was clearer.

Example 2

Inks having a gradient of viscosity of between 22 and 12 mPas across the colours C-M-Y-K were prepared and tested using wet-on-wet printing according to the printing process outlined above. To achieve the viscosity gradient the monofunctional to polyfunctional ratio was varied from 0.35 to 1.5.

The gradient of viscosity was varied from CYAN to BLACK starting at 22 mPas for CYAN and ending at 12 mPas for BLACK, using the following order for the colours:

| | |
|---|---|
| 1) CYAN | 22 mPas |
| 2) MAGENTA | 18 mPas |
| 3) YELLOW | 14 mPas |
| 4) BLACK | 12 mPas |

As in Example 1, this gave improved print results compared with inks having the same viscosity.

Example 3

Inks having a gradient of surface tension across the colours C-M-Y-K were prepared and tested using wet-on-wet printing according to the printing process outlined above. The surface tension ranged between 22 and 31 dynes/cm. The surface tension gradient was achieved by modifying the amount of surfactant additives added in the ink compositions from 0.02% to 0.8%.

A gradient of surface tension starting from CYAN at 22 dynes/cm and ending with BLACK at 31 dynes/cm was tested, using the following order for the colours:

| | |
|---|---|
| 1) CYAN | 22 dynes/cm |
| 2) MAGENTA | 25 dynes/cm |
| 3) YELLOW | 28 dynes/cm |
| 4) BLACK | 31 dynes/cm |

As in Example 1, this gave improved print results compared with inks having the same surface tension

Example 4

Inks having a gradient of surface tension starting from CYAN at 31 dynes/cm and ending with BLACK at 22 dynes/cm were also tested.

The inks were used in the following order:

| | |
|---|---|
| 1) CYAN | 31 dynes/cm |
| 2) MAGENTA | 28 dynes/cm |
| 3) YELLOW | 25 dynes/cm |
| 4) BLACK | 22 dynes/cm |

As in Example 1, this also gave improved print results compared with inks having the same surface tension.

Example 5

Inks having a gradient of cure speed over the colours C-M-Y-K were prepared and tested. A range of cure speed between 30 and 50 m/minute were used, when measuring a 12 μm film of ink coated onto rigid PVC and passed under a 120 W/cm. medium pressure UV mercury lamp was used. The cure speed gradient was varied by modifying the amount of photoinitiator and synergist additives. A gradient of speeds starting from CYAN at 30 m/min and ending with BLACK at 50 m/min were tested.

The inks were used in the following order:

| | |
|---|---|
| 1) CYAN | 30 m/min |
| 2) MAGENTA | 37 m/min |
| 3) YELLOW | 45 m/min |
| 4) BLACK | 50 m/min |

As in Example 1, this gave improved print results compared with inks having the same cure speeds.

Example 6

Inks were prepared having a gradient of cure speed over the colours C-M-Y-K and tested. A range of cure speed between 50 and 30 m/minute were used, when measuring a 12 micron film of ink coated onto rigid PVC and passed under a 120 W/cm. medium pressure UV Mercury lamp was used. The cure speed gradient was prepared by modifying the amount of initiators and synergist additives. A gradient of speeds starting from CYAN at 50 m/min and ending with BLACK at 30 m/min were used.

The inks were used in the following order:

| | |
|---|---|
| 1) CYAN | 50 m/min |
| 2) MAGENTA | 43 m/min |
| 3) YELLOW | 36 m/min |
| 4) BLACK | 30 m/min |

As in Example 1, this gave improved print results compared with inks having the same cure speeds.

The invention claimed is:

1. A single pass progressive dot printing ink-jet process comprising the steps of:
  applying a first UV curable ink drop to a substrate;
  applying a second UV curable ink drop on to the first UV curable ink drop without intermediate solidification of the first UV curable ink drop; and
  subsequently applying additional UV curable ink drops sequentially to the combined first and second UV curable ink drops without intermediate solidification of the first and second UV curable ink drops; wherein
  a viscosity of the first to the additional UV curable ink drops applied varies in a graduated manner within a range of from 10 up to 30 mPa·s or a range of from 30 down to 10 mPa·s; and
  a curing speed of the first to the additional UV curable ink drops applied varies in a graduated manner within a range of from 20 up to 70 m/min or a range of from 70 down to 20 m/min.

2. The single pass progressive dot printing ink-jet process according to claim 1, wherein at least four UV curable ink drops are applied sequentially during a single pass of the substrate.

3. The single pass progressive dot printing ink-jet process according to claim 1, wherein the first and second UV curable ink drops are different colors.

4. The single pass progressive dot printing ink-jet process according to claim 3, wherein the UV curable ink drops are selected from cyan, magenta, yellow and black.

5. The single pass progressive dot printing ink-jet process according to claim 1, wherein a surface tension of the first to the additional UV curable ink drops applied varies in a graduated manner within a range of from 20 up to 40 dynes/cm or a range of from 40 down to 20 dynes/cm.

6. A set of UV curable ink-jet inks suitable for use in a single pass progressive dot printing ink-jet process comprising:
  at least four UV curable inks having a different viscosity, surface tension, and curing speed; wherein
  the viscosity of the UV curable inks varies in a graduated manner within a range of from 10 up to 30 mPa·s or a range of from 30 down to 10 mPa·s;
  the surface tension of the UV curable inks varies in a graduated manner within a range of from 20 up to 40 dynes/cm or a range of from 40 down to 20 dynes/cm; and
  the curing speed of the UV curable inks varies in a graduated manner within a range of from 20 up to 70 m/min or a range of from 70 down to 20 m/min.

7. The set of UV curable ink-jet inks according to claim 6, wherein the UV curable inks are selected from cyan, magenta, yellow and black.

8. An ink dispenser holding a set of UV curable ink-jet inks according to claim 6.

9. A single pass progressive dot printing ink-jet process comprising the steps of:
  applying a first UV curable ink drop to a substrate; and
  applying a second UV curable ink drop on to the first UV curable ink drop without intermediate solidification of the first UV curable ink drop,
  wherein subsequent UV curable ink drops are applied sequentially to the combined first and second UV curable ink drops without intermediate solidification of the first and second UV curable ink drops,
  wherein a viscosity of the first to a last UV curable ink drop applied varies in a graduated manner within a range of from 10 up to 30 mPa·s or a range of from 30 down to 10 mPa·s.

10. A single pass progressive dot printing ink-jet process comprising the steps of:
  applying a first UV curable ink drop to a substrate; and
  applying a second UV curable ink drop on to the first UV curable ink drop without intermediate solidification of the first UV curable ink drop,
  wherein subsequent UV curable ink drops are applied sequentially to the combined first and second UV curable ink drops without intermediate solidification of the first and second UV curable ink drops,
  wherein a surface tension of the first to a last UV curable ink drop applied varies in a graduated manner within a range of from 20 up to 40 dynes/cm or a range of from 40 down to 20 dynes/cm.

11. A single pass progressive dot printing ink-jet process comprising the steps of:
  applying a first UV curable ink drop to a substrate; and
  applying a second UV curable ink drop on to the first UV curable ink drop without intermediate solidification of the first UV curable ink drop,
  wherein subsequent UV curable ink drops are applied sequentially to the combined first and second UV curable ink drops without intermediate solidification of the first and second UV curable ink drops,
  wherein a cure speed of the first to a last UV curable ink drop applied varies in a graduated manner within a range of from 20 up to 70 m/min or a range of from 70 down to 20 m/min.

12. The single pass progressive dot printing ink-jet process according to claim 9, 10, or 11, wherein at least four UV curable ink drops are applied sequentially during a single pass of the substrate.

13. The single pass progressive dot printing ink-jet process according to claim 9, 10, or 11, wherein the first and second UV curable ink drops are different colors.

14. The single pass progressive dot printing ink-jet process according to claim 9, 10, or 11, wherein the UV curable ink drops are selected from cyan, magenta, yellow and black.

15. A set of UV curable inkjet inks suitable for use in a single pass progressive dot printing inkjet process comprising:
  at least four UV curable inks having a different viscosity, wherein the viscosity of the UV curable inks varies in a graduated manner within a range of from 10 up to 30 mPa·s or a range of from 30 down to 10 mPa·s.

16. A set of UV curable inkjet inks suitable for use in a single pass progressive dot printing inkjet process comprising:
  at least four UV curable inks having a different surface tension, wherein the surface tension of the UV curable inks varies in a graduated manner within a range of from 20 up to 40 dynes/cm or a range of from 40 down to 20 dynes/cm.

17. A set of UV curable inkjet inks suitable for use in a single pass progressive dot printing inkjet process comprising:
  at least four UV curable inks having a different curing speed, wherein the curing speed of the UV curable inks varies in a graduated manner within a range of from 20 up to 70 m/min or a range of from 70 down to 20 m/min.

18. The ink-jet set according to claim 15, 16, or 17, wherein the at least four UV curable inks include cyan, magenta, yellow and black.

19. The ink-jet set according to claim 15, 16, or 17, wherein each of the at least four UV curable inks includes a cationic photoinitiator.

20. The ink-jet set according to claim 15, 16, or 17, wherein each of the at least four UV curable inks includes a pigment as a colorant.

21. The ink-jet set according to claim 15, 16, or 17, wherein each of the four UV curable inks includes:

| | |
|---|---|
| a) monofunctional acrylate | 15-45%; |
| b) polyfunctional acrylate | 45-55%; |
| c) photoinitiators | 1.0-6.0%; |

-continued

| | |
|---|---|
| d) synergist additive | <5%; |
| e) pigment dispersion | <3%; and |
| f) surfactant additive | 0.01-2.0%. |

\* \* \* \* \*